US011554352B2

(12) United States Patent
Schacht et al.

(10) Patent No.: US 11,554,352 B2
(45) Date of Patent: Jan. 17, 2023

(54) METHOD AND APPARATUS FOR INJECTING A GAS INTO A BEVERAGE

(71) Applicant: STARBUCKS CORPORATION, Seattle, WA (US)

(72) Inventors: Alexander Schacht, Bainbridge Island, WA (US); Michael Cummer, Seattle, WA (US)

(73) Assignee: Starbucks Corporation, Seattle, WA (US)

( * ) Notice: Subject to any disclaimer, the term of this patent is extended or adjusted under 35 U.S.C. 154(b) by 624 days.

(21) Appl. No.: 16/483,018

(22) PCT Filed: Jan. 29, 2018

(86) PCT No.: PCT/US2018/015785
§ 371 (c)(1),
(2) Date: Aug. 1, 2019

(87) PCT Pub. No.: WO2018/144394
PCT Pub. Date: Aug. 9, 2018

(65) Prior Publication Data
US 2020/0122099 A1 Apr. 23, 2020

Related U.S. Application Data

(63) Continuation-in-part of application No. 15/423,430, filed on Feb. 2, 2017, now Pat. No. 11,147,294.

(51) Int. Cl.
*B01F 23/2361* (2022.01)
*A23L 2/54* (2006.01)
(Continued)

(52) U.S. Cl.
CPC ............ *B01F 23/2361* (2022.01); *A23F 3/16* (2013.01); *A23F 5/24* (2013.01); *A23L 2/54* (2013.01);
(Continued)

(58) Field of Classification Search
CPC .... A47J 31/60; A47J 31/4489; A47J 31/4403; A47J 31/46; B01F 23/2132;
(Continued)

(56) References Cited

U.S. PATENT DOCUMENTS 3,281,014 A 10/1966 Nickerson
4,438,147 A 3/1984 Hedrick
(Continued)

FOREIGN PATENT DOCUMENTS

CN 104814504 A 8/2015
EP 1 226 078 7/2007
(Continued)

OTHER PUBLICATIONS

Anonymous, "Beer glassware—Wikipedia"; dated Jan. 1, 2017, XP055747676, retrieved form the internet: URL: https://en.wikipedia.org/w/index/php?title=Beer_glassware&oldid=757731678 [retrieved on Nov. 6, 2020].
(Continued)

*Primary Examiner* — Hong T Yoo
(74) *Attorney, Agent, or Firm* — Knobbe, Martens, Olson & Bear, LLP

(57) ABSTRACT

Disclosed herein are techniques and methods for dispersing a volume of gas in a beverage contained in an unpressurized container.

16 Claims, 7 Drawing Sheets

(51) Int. Cl.
| | |
|---|---|
| *A23F 3/16* | (2006.01) |
| *A23F 5/24* | (2006.01) |
| *B01F 35/71* | (2022.01) |
| *C12C 11/11* | (2019.01) |
| *B01F 23/237* | (2022.01) |
| *B01F 101/14* | (2022.01) |

(52) U.S. Cl.
CPC .. *B01F 35/718051* (2022.01); *A23V 2002/00* (2013.01); *B01F 23/23765* (2022.01); *B01F 2101/14* (2022.01); *C12C 11/11* (2013.01)

(58) Field of Classification Search
CPC ............... B01F 2101/17; B01F 23/454; B01F 23/23121; B01F 23/236; B01F 23/2376; B01F 23/23762; B01F 23/237621; B01F 23/2361; B01F 35/718051; B01F 23/23765; B01F 2101/14; A23F 3/16; A23F 5/24
See application file for complete search history.

(56) References Cited

U.S. PATENT DOCUMENTS

| | | | |
|---|---|---|---|
| 4,565,706 | A | 1/1986 | Wertheim et al. |
| 4,746,527 | A | 5/1988 | Kuypers |
| 5,396,934 | A | 3/1995 | Moench |
| 5,462,759 | A | 10/1995 | Westerbeek et al. |
| 5,882,716 | A | 3/1999 | Munz-Schaerer et al. |
| 6,048,567 | A | 4/2000 | Villagran et al. |
| 6,427,929 | B1 | 8/2002 | Nguyen et al. |
| 7,018,668 | B2 | 3/2006 | Villagran et al. |
| 8,505,442 | B2 | 8/2013 | Ishida et al. |
| 9,321,018 | B2 | 4/2016 | Connors |
| 9,364,117 | B2 | 6/2016 | Prefontaine |
| 11,147,294 | B2 | 10/2021 | Schacht et al. |
| 2003/0161933 | A1 | 8/2003 | Anderson et al. |
| 2005/0129807 | A1 | 6/2005 | Yuan et al. |
| 2005/0276898 | A1 | 12/2005 | Pascual et al. |
| 2009/0323459 | A1 | 12/2009 | Windhab et al. |
| 2010/0303971 | A1 | 12/2010 | Melms et al. |
| 2012/0082769 | A1 | 4/2012 | Singh |
| 2013/0145936 | A1 | 6/2013 | Dollner et al. |
| 2014/0227413 | A1 | 8/2014 | Bombeck et al. |
| 2015/0329343 | A1 | 11/2015 | Kleinrchert |
| 2017/0079464 | A1* | 3/2017 | Apone .................. A47J 31/441 |
| 2018/0213824 | A1 | 8/2018 | Schacht et al. |
| 2018/0310754 | A1 | 11/2018 | de Graaff et al. |

FOREIGN PATENT DOCUMENTS

| | | | |
|---|---|---|---|
| EP | 2897894 | B1 | 7/2015 |
| JP | H03-228645 | A | 10/1991 |
| JP | H10-287393 | A | 10/1998 |
| JP | 2000-85894 | A | 3/2000 |
| JP | 2003-070644 | A | 3/2003 |
| TW | I583311 | B | 5/2017 |
| WO | WO 01/32530 | A1 | 5/2001 |
| WO | WO 2014/037733 | A1 | 3/2014 |
| WO | WO 2014/069994 | A1 | 5/2014 |
| WO | WO 2016/073744 | A1 | 5/2016 |
| WO | WO 2017/003288 | A1 | 1/2017 |
| WO | WO 2018/144394 | A1 | 8/2018 |

OTHER PUBLICATIONS

Anonymous "Inside Look at Nitro Coffee Quick Cascade™ Lid with Diffusion Stone"; <URL https://www.youtube.com/watch?v=gSHEaqBJN5I > dated Jun. 6, 2016, accessed Nov. 3, 2020.

Anonymous, "Nitro Cold Brew Coffee—What is it?—Cold Brew Queen"; dated Jan. 1, 2016, XP055426465, Retrieved from the Internet: URL: https://coldbrewqueen.com/nitro-cold-brew-coffee/ [retrieved on Nov. 17, 2017].

Anonymous Hands On Review: .5 Micron Oxygenation Stone—Video and Pictures. <URL https://www.homebrewfinds.com/2013/01/hands-on-5-micron-oxygenation-stone.html > dated Jan. 31, 2013, printed Nov. 3, 2020.

Australian Examination Report for Australian Patent Application No. 2018216742, dated Jun. 4, 2020 in 6 pages.

European Search Report for European Patent Application No. EP124591-RB dated Nov. 16, 2020 in 10 pages.

Howcast, "How to Do Circular breathing | Saxophone Lessons"; dated Sep. 2, 2013, p. 1, XP054981079, Retrieved from the Internet: URL: http://www.youtube.com/watch?v=vAmXrDW6UWs [retrieved on Nov. 5, 2020].

The National Center for Atmospheric Reseach & the UCAR Office of Programs, What's in Air, retrieved online Oct. 9, 2019, pp. 1 http://www.eo.ucar.edu/basics/wx_1_b_1.html (Year: 2019).

Sweirczynski, Duane, Big Book O'Beer, p. 80 http ://www. google.com/books/edition/The_Big_Book_O_Beer/8EqZhwKI8b0C?hl=en&gbpv=1&dq=flavored+beer+with+fruit+and+coffee&pg=PA80&printsec=frontcover (Year:2004).

May 30, 2018, International Search Report and Written Opinion for Application No. PCT/US18/15785, filed on Jan. 29, 2018 in 18 pages.

Califia Farms, "Califia Farms Launches First Dairy-free, Nitro Draft Cold Brew Latte." http://www.califiafarms.com/press-releases/. Jun. 27, 2016.

Columbia University Press; Cesar Vega et al., The kitchen as laboratory: reflections on the science of food and cooking; New York 2013.

The New York Dog, "Chefs incorporate coffee, tea to give desserts a kick." http://www.thenewyorkdog.com; Copyright 2016.

NitroBrew, "Other Beverages." http://www.nitrobrew.com; Copyright 2016.

Rodriguez, Ashley; NitroBrew, "Café owners rejoice! There's now a way to do nitro without breaking the bank." Feature in Barista Magazine; http://www.nitrobrew.com; Copyright 2016.

Szkaradnik, Carly; Vox Media, Inc., "La Colombe Ups Its Nitro Coffee Game, Unveils Draft Lattes." http://philly.eater.com; Copyright 2016.

Viceroy Holland BV; "Foaming Coffee Creamer." http://viceroyholland.com; Copyright 2016.

* cited by examiner

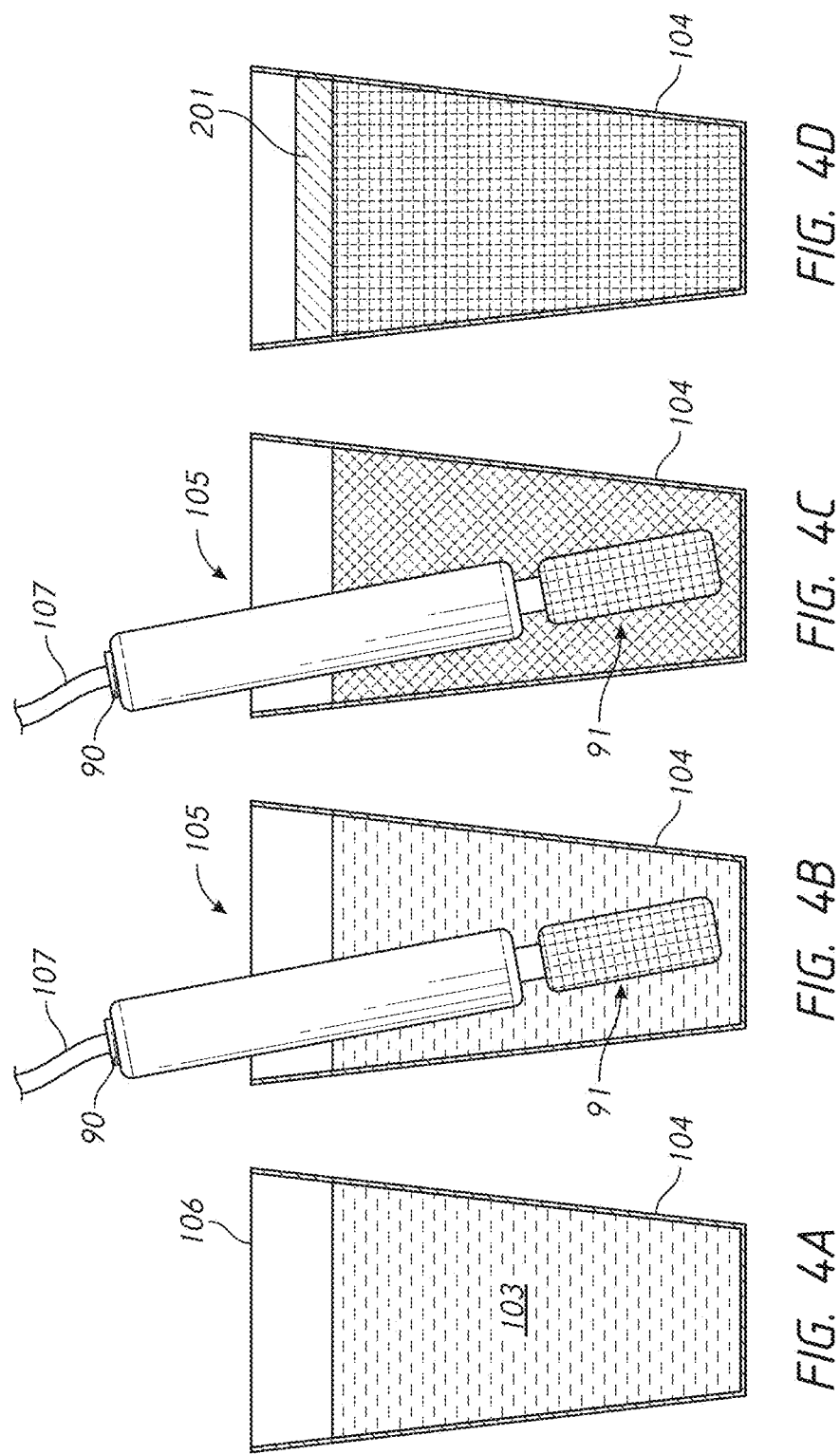

METHOD AND APPARATUS FOR INJECTING A GAS INTO A BEVERAGE

BACKGROUND

Field

This disclosure relates to a method and apparatus for injecting a gas into a beverage and, in certain embodiments, to a method and apparatus for injecting nitrogen into a beverage.

Description of the Certain Related Art

Carbonation of beverages is practiced to produce an effervescent effect in beverages. However, as the carbon dioxide gas dissolves in beverages, carbonic acid is formed, giving carbonated beverages a characteristic acidic taste. Nitrogenation is an alternative to carbonation. Nitrogenation can produce a unique effervescent effect in the beverage, creating a creamy head of foam. However, like carbonation, nitrogenation of beverages traditionally requires the application of nitrogen to large kegs, or other vessels having a carefully controlled internal pressure well above atmospheric conditions, as well as a specialized dispensing tap.

BRIEF DESCRIPTION OF THE DRAWINGS

Various embodiments are depicted in the accompanying drawings for illustrative purposes, and should in no way be interpreted as limiting the scope of the embodiments. Various features of different disclosed embodiments can be combined to form additional embodiments, which are part of this disclosure.

FIGS. 4A-D illustrate an embodiment of a method of injecting a gas into a beverage housed in an unpressurized container according to an embodiment of the present disclosure.

DETAILED DESCRIPTION OF CERTAIN EMBODIMENTS

Figure 1:
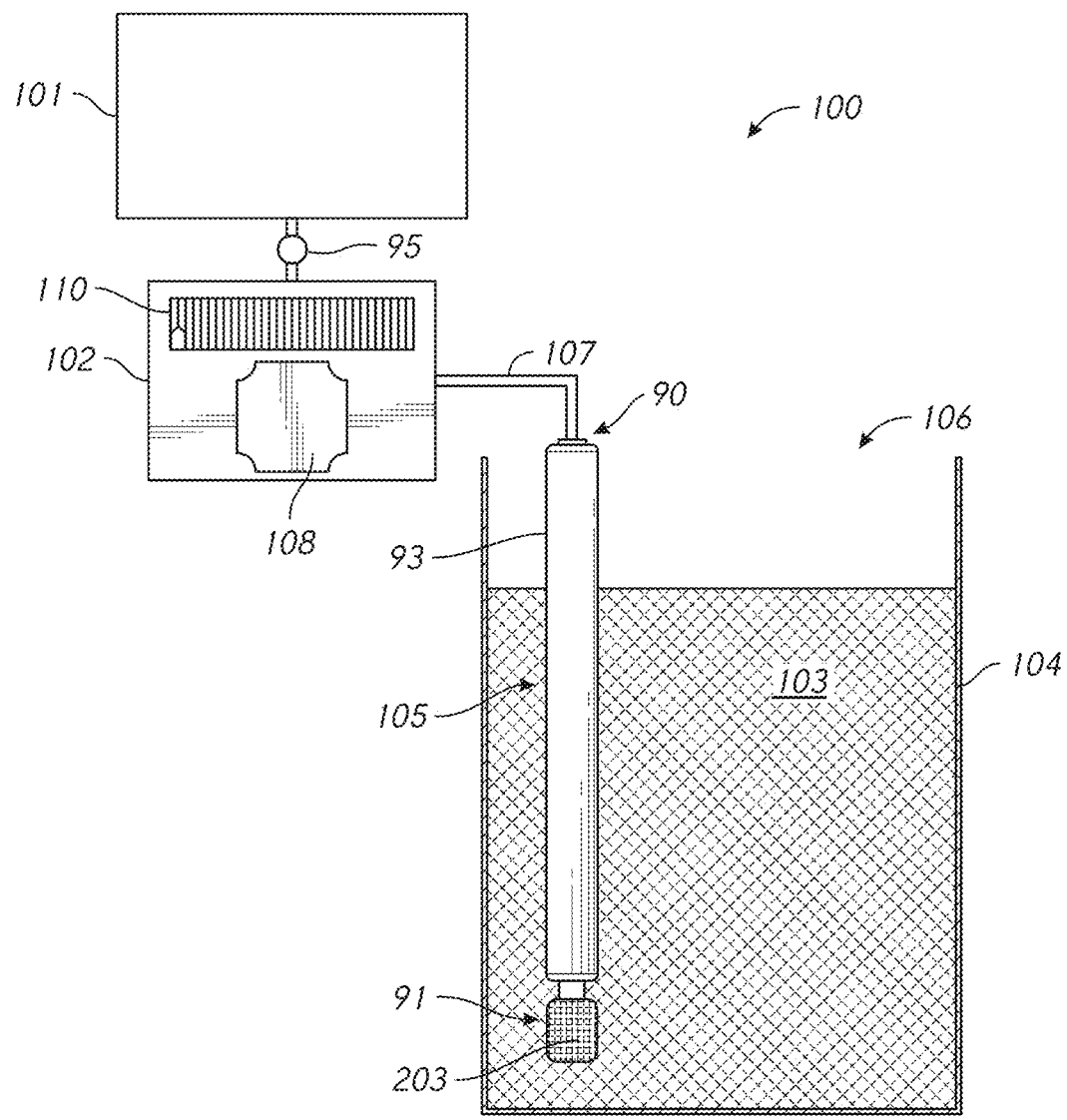
FIG. 1 illustrates an apparatus for dispersing a gas into a beverage in accordance with an embodiment of the present disclosure.

Various beverage nitrogenation systems and methods are described below to illustrate various examples that may achieve one or more desired improvements. These examples are only illustrative and not intended in any way to restrict the general disclosure presented and the various aspects and features of this disclosure. The general principles described herein may be applied to embodiments and applications other than those discussed herein without departing from the spirit and scope of the disclosure. Indeed, this disclosure is not limited to the particular embodiments shown, but is instead to be accorded the widest scope consistent with the principles and features that are disclosed or suggested herein.

Although certain aspects, advantages, and features are described herein, it is not necessary that any particular embodiment include or achieve any or all of those aspects, advantages, and features. For example, some embodiments may not achieve the advantages described herein, but may achieve other advantages instead. Any structure, feature, or step in any embodiment can be used in place of, or in addition to, any structure, feature, or step in any other embodiment, or omitted. This disclosure contemplates all combinations of features from the various disclosed embodiments. No feature, structure, or step is essential or indispensable.

Nitrogenation is the process of dissolving nitrogen gas into a liquid. In certain arrangements, nitrogenation can allow the production of a beverage having a silkier texture and creamier flavor than a beverage that is subjected to traditional carbonation or has no added gas at all. However, nitrogen is significantly less soluble in water than carbon dioxide used in traditional carbonation techniques. As such, dispersing nitrogen into beverages can present its own set of challenges.

The solubility of a gas within a liquid can be dependent on several factors including the temperature of the system, and the partial pressure of the gas of interest. The solubility of a gas increases as the partial pressure of the gas in the gas-liquid mixture increases. Accordingly, nitrogenation techniques have traditionally required large kegs, or other suitable containers capable of maintaining internal pressures well above atmospheric conditions for prolonged periods to compensate for nitrogen's low solubility, and to force a portion of the gas to dissolve. However, these large containers can be inconvenient to store, costly to maintain, and complicate the production of customized beverages tailored to individual customer tastes and orders, as different pressurized containers can be required for each nitrogenated beverage. Furthermore, kegs are costly, and keg-based systems can be difficult to maintain.

Described herein are techniques and methods for nitrogenating beverages or injecting other types of gases into a beverage that can eliminate the need for pressurized kegs. Furthermore, the techniques and methods described herein can, in certain arrangements, allow for the production of a customized and/or individualized nitrogenated beverage that can be prepared in individual portions for each customer. Moreover, in certain embodiments, the techniques and methods described herein can produce a greater volume of foam than prior methods. In certain embodiments, the techniques and methods described herein can require far less nitrogen to achieve a given volume of foam than prior keg-based systems. Finally, because in certain arrangements, the nitrogenation can be performed on a serving-by-serving basis, the techniques and methods described of certain embodiments described herein can provide the opportunity for increased customizability and theatre in the preparation of nitrogenated beverages.

In certain arrangements described herein, the techniques and methods are elegant to perform, require a reduced number of steps and are cost effective to implement. Various embodiments described herein can utilize a storage device in fluid communication with a delivery device. For example, in certain embodiments, as compared to traditional nitrogenation processes, the nitrogenation process can be conducted in view of a customer who will be consuming the nitrogenated beverage, which can enhance the experience of the customer. The delivery device can include a plurality of outlet pores. In one method of use, the delivery device can be submerged within a serving of a beverage residing in an unpressurized container. Submerging the delivery device within the beverage can comprise inserting a portion the delivery device into a beverage and/or covering a portion of the delivery device with a beverage for example by pouring a beverage over a portion of the delivery device. Once a flow of nitrogen gas is initiated, nitrogen can flow from the storage device to the delivery device. There, nitrogen bubbles can exit through the outlet pores on the submerged end of the delivery device. The nitrogen bubbles can travel upwards through the beverage while a portion of the nitrogen gas is dissolved into the liquid. Since the container can be unpressurized, a fine silky head of foam can form at the surface interface of the beverage, as nitrogen bubbles are trapped by the surface tension of the fluid. In certain embodiments, the container in which the delivery device is submerged can be the same container, such as a cup, that is provided to the customer and/or consumer of the beverage. In certain embodiments, the delivery device can be integrated into the container. For example, in certain embodiments, the delivery device can be located in a lower portion of the container. In such arrangements, once the beverage is nitrogenated the beverage can be poured out of the container and into a second container such as a cup that can be used by the customer and/or consumer of the beverage, or the container may include a disposable delivery device, which can be discarded with the container after the beverage is consumed.

As used herein, the term "beverage" has its ordinary and customary meaning, and includes, among other things, any edible liquid or substantially liquid substance or product having a flowing quality (e.g., coffee, cold brew coffee, coffee beverages, milk, dairy products, juices, teas, frozen yogurt, beer, wine, cocktails, liqueurs, spirits, cider, soft drinks, flavored water, energy drinks, soups, broths, combinations of the same, or the like). By way of example, the beverage may be drip coffee, cold brew coffee, espresso, skim milk, reduced fat milk, whole milk, cream, green tea, black tea, chai tea, and/or combinations of any of the aforementioned items among others. In some embodiments, the beverage may be a portion of a larger drink. By way of example, in some embodiments, the beverage may be a serving of milk, which can be nitrogenated before it is combined with additional ingredients, such as espresso, coffee, tea, flavoring products, among others. While the methods and apparatuses described herein are particularly useful for injecting nitrogen into a beverage and thus are often described with respect to embodiments that utilize nitrogen, the methods and apparatuses described herein may also find utility for injecting other types of gases into a beverage.

In some embodiments, the beverage is housed in a vessel. In some embodiments, the beverage residing within the vessel need not be pressurized. In some embodiments, the vessel is open to the atmosphere and thus does not require a lid and/or can include a lid with one or more openings. Advantageously, certain arrangements of the techniques and methods disclosed can allow for the nitrogenation of a single serving of a beverage at atmospheric pressure, which can greatly simplify the production of nitrogenated beverages and greatly increase customization options. In some embodiments, a delivery device can be inserted into the container, and submerged in the beverage residing therein, through an opening at the top of the container.

The delivery device may comprise an infuser, a nozzle, a sparger, an injector, a static mixer, an aerator block, a frit, carbonation stone or any other suitable delivery device capable of dispersing nitrogen into a solution. In some embodiments, the delivery device is comprised of food grade stainless steel for food safety, corrosion resistance, and for ease of cleaning. However, it will be apparent to those skilled in the art that other materials may be used as well, such as various ceramics, metals and plastics, among others. In some embodiments, the delivery device comprises an inlet portion and an outlet portion. The inlet portion can be in fluid communication with a storage device. The outlet portion may be disposed on or near the second end of the tube, substantially opposite the inlet portion of the tube. In certain embodiments, the outlet portion comprises an infuser, a nozzle, a sparger, an injector, a static mixer, an aerator block, a frit, carbonation stone or any other suitable delivery device known to one skilled on the art to be capable of dispersing nitrogen into a solution. In some embodiments, the outlet region may comprise a hollow tube having porous walls. In some embodiments, the porous walls can comprise openings that can have a diameter of about 2 µm in one embodiment and in certain embodiments about 0.2 µm, 0.5 µm, 1 µm, 10 µm, and/or 25 µm and in certain embodiments the openings can have diameters from about 0.1 µm to about 150 µm; and in one embodiment from about 1 µm to about 100 µm; 10 µm to 50 µm; or about 20 µm to 25 µm. In some embodiments, the outlet portion may comprise pores of varying size. For instance, in certain embodiments, the outlet portion is comprised of a sintered material having a nominal pore size of approximately 2 µm and in certain embodiments about 0.2 µm, 0.5 µm, 1 µm, 10 µm, and/or 25 µm and in certain embodiments the openings can have diameters from about 0.1 µm to about 150 µm; and in one embodiment from about 1 µm to about 100 µm; 10 µm to 50 µm; or about 20 µm to 25 µm. The nominal porosity, porosity grade, or media grade, is generally used to refer to the mean pore size of the material. In certain embodiments, the openings are circular. In some embodiments, the outlet portion is comprised of sintered stainless steel. In certain embodiments, the outlet portion comprises a sintered material which is made from a powder that has been sintered together to form porous material. In certain embodiments, the outlet portion comprises a sintered metal material which is made from a metal powder that has been sintered together to form porous material. In certain embodiments, the outlet portion comprises a sintered stainless steel which is made from a metal powder that has been sintered together to form porous material that forms a plurality of outlet pores.

In some configurations, the delivery device could be adapted to expel a wide variety of substances, in addition to compressed gas. For example, in some embodiments, the delivery device could be configured to expel flavorings or other ingredients into beverages. For instance, fluids may be passed through the device and expelled. In some embodiments, additional beverage components, or beverages, may be expelled from the device. For example, in some embodiments, espresso could be passed through the delivery device into a cup of hot water to produce an Americano. Other configurations are feasible as well. For instance, to facilitate cleaning of the device, a mixture of water and detergent could be flowed through the device.

In certain embodiments, the storage device comprises a reservoir of compressed gas such as, for example, nitrogen. In some embodiments, a control device for controlling the rate of nitrogen delivery is disposed between the storage device and the delivery device. The control device may be used to initiate, meter and/or halt the flow of nitrogen from the storage device to the delivery device. In some embodiments, the flow control device allows an operator to control the rate and pressure at which nitrogen is routed to the delivery device and dispersed within the beverage. In certain arrangement, the control device comprises a valve that can be connected to a manual or electronic control mechanism. The valve can be positioned on and/or near the delivery device, the storage device and/or a line connecting the delivery device to the storage device. In certain embodiments, a regulator can be provided between the storage device and the delivery device.

In certain embodiments, the pressure of nitrogen delivered to the delivery device can be dependent on the characteristics of the delivery device, the beverage, and the nitrogen mixture. For example, in some embodiments, the optimal pressure may depend on the geometry and porosity of the outlet portion of the delivery device. Accordingly, it will be apparent to those skilled in the art that the optimal range of pressures will vary widely. Nevertheless, in some embodiments, the pressure may be less than about 0.5 psi, less than about 1 psi, less than about 1.5 psig, less than about 3 psig, less than about 6 psig, or less than about 10 psig. In some embodiments, the pressure may range between 0.5 psig and 6 psig, between 1 psig and 5 psig, or between 1.5 psig and 4 psig. In some embodiments, the pressure may be greater than about 1 psig, greater than about 2 psig, or greater than about 10 psig. In certain embodiments, a pressure of about 1 psig to about 8 psig can be particularly advantageous when combined with a sparger about 3 inches in length, about ¾ inches in diameter, and having a mean outlet pore size of about 2 microns, though other configurations are suitable.

In some embodiments, the pressure can be maintained for longer than about 10 seconds, longer than about 30 seconds, longer than about 1 minute, longer than about 2 minutes, longer than about 3 minutes, or longer than about 5 minutes. In some embodiments, the pressure can be maintained for about 5 seconds to 2 minutes, about 10 seconds to 1 minute, or about 10 to 30 seconds. The nitrogen flow can be maintained for an extended period of time to reach the desired level of saturation, or the process can be repeated as necessary. In some embodiments, the amount of pressure, or duration of dispersal can vary between dispersals and can be a function of the type of beverage being nitrogenated and/or the desired amount of nitrogenation, or a function of certain characteristics of the delivery device, such as inlet size, internal width, porosity of the outlet portion, individual pore size, and mean pore size, among other considerations. In some embodiments, the process can be repeated at least twice, at least four times, less than eight times, or about three times. In some configurations, it can be advantageous to slowly increase the amount of pressure until the desired amount of pressure is reached. For example, in some embodiments, the delivery device may be submerged within the beverage, and the pressure may be increased from 0 to the desired level over a period of more than about 5 seconds, more than about 2 seconds, between 0 and 10 seconds, or less than about 2 seconds. In some embodiments, nitrogenation may continue until the desired amount of foam forms at the head of the beverage. In some embodiments, the flow of gas may continue as the delivery device is removed from the beverage. In other embodiments, the flow of gas may cease before the delivery device is removed.

The storage device can be any suitable container for holding gas. In one embodiment, the storage device can be any suitable container for holding a compressed gas. In certain embodiments, the storage device can be external to the delivery device, or can be disposed within the delivery device or coupled directly to the delivery device such that the delivery device and the storage device can be moved together as an integral unit. When the storage device is disposed within the delivery device or forms an integral unit with the delivery device, the storage device can be refilled with compressed gas by connecting the storage device to an external source of gas. Advantageously, incorporating the storage device within the delivery device or integrating the two components into an integral unit can allow the apparatus to be carried by hand, and used to nitrogenate beverages anywhere, without requiring an external source of compressed gas to be carried as well. Additionally, in some embodiments, the delivery device may be attached directly to a nitrogen separator system, or other suitable source of gas, rather than a reservoir of compressed gas.

The storage device can dispense pure nitrogen, or nitrogen mixed with one or more additional gasses. By way of example, the storage device can dispense pure nitrogen gas, substantially pure nitrogen gas, beer gas, nitrogen gas mixed with carbon dioxide, and carbon dioxide, although the skilled artisan will recognize that additional gasses and mixtures of gasses may be used. For instance, beer gas, traditionally a combination of nitrogen and carbon dioxide in a ratio of 70% $N_2$ and 30% $CO_2$, may be used. However, additional ratios are also suitable, and the gas released by the storage device may comprise varying concentrations of nitrogen. In some embodiments, the gas released by the storage device can comprise about 100% nitrogen, at least about 90% nitrogen, at least about 80% nitrogen, between 80% and 70% nitrogen, less than about 70% nitrogen, or any value therein. In some embodiments, the gas released by the storage device can be 90% nitrogen and 10% $CO_2$, 80% nitrogen and 20% $CO_2$, 70% nitrogen and 30% $CO_2$, 60% nitrogen and 40% $CO_2$, or the like.

FIG. 1 depicts an illustrated embodiment of an apparatus 100 and method for nitrogenating a beverage 103 in accordance with an embodiment of the present disclosure. As noted above, while the embodiments described herein are often described with reference to nitrogen, in certain embodiments other gases can be used. The beverage 103 can be housed in an unpressurized vessel or container 104. In certain embodiments, the container 104 can be cup or bottle that is ultimately used to consume the beverage by an end user. The apparatus can include a delivery device 105, a portion of which can be submerged into the beverage 103 through an opening 106 in the vessel 104. The delivery device 105 can be in fluid communication with a storage device 101 through a source line 107. In certain embodiments, the source line 107 can comprise a flexible piece of tubing that allows a user to manipulate and move the delivery device 105 with respect to storage device 101.

The storage device can be any suitable container for storing a gas such as a compressed gas and in one embodiment stores compressed nitrogen. A control device 102 can be disposed along the source line 107 between the delivery device 105 and the storage device 101 and can allow an operator to initiate, regulate, and/or halt a flow of nitrogen from the storage device 101 to the delivery device 105. The control device 102 may have a dial 108 or other suitable mechanism coupled to a valve (not shown) to adjust the flow rate of the nitrogen gas through the source line 107. For instance, in some embodiments, the user can rotate the dial 108 to increase or decrease the flow rate of nitrogen gas through the source line 107. Moreover, the dial 108 may include hash marks to visually identify the rate of flow. In some embodiments, the control device 102 may further comprise a display 110 such as a gauge, meter, screen, or other visual indication to visually depict the pressure and rate of flow of nitrogen gas. In some exemplary configurations, one or more of the control device 102 and delivery device 105 may include a vibrational motor configured to alert the user when a desired flow rate has been achieved, or when a desired amount of gas has been delivered into the receptacle. However, other configurations may be employed to provide feedback to the user concerning various aspects of the nitrogenation process. For instance, in some configurations, a speaker or display may be incorporated into the control device 102 or delivery device 105 to provide visual or auditory feedback concerning the progress of gas infusion. Likewise, in certain embodiments, the control device 102 can be configured for automatic operation such that by pressing a switch or button the control device 102 can automatically control the flow of gas through the source line 107 according to preset control routines. Such a feature can be used in combination with a manually adjusted valve as described above or as an alternative. As will be discussed below with reference to FIGS. 3A, 3B and 5, in certain embodiments, the control device and valve can be disposed on/or within the delivery device itself. Such a configuration may advantageously prevent excess gas from passing through the delivery device after the valve has been closed by eliminating excess tubing between the control device and the delivery device, which would otherwise allow excess space for the gas to reside within once the flow of gas had ceased.

In the illustrated embodiment, a pressure regulator 95 can be positioned between the storage device 101 and the control device 102. In certain embodiments, the nitrogen within the storage device 101 can be at a relatively high pressure such as a pressure of about 45 psi or about 2000 psi. The pressure regulator 95 can be used to reduce the pressure from the storage device 101 to a lower desired value, which in one embodiment can be about 3.5 psi. In certain embodiments, more than one pressure regulator can be provided.

With continued reference to FIG. 1, the delivery device 105 can include an inlet portion 90 that is in fluid communication with the source line 107 and an outlet portion 91, which can include one or more outlet pores 203 through which nitrogen flowing through the delivery device 105 can be delivered to the beverage 103. The delivery device 105 can include a tubular wand 93 that extends between the inlet portion 90 and the outlet portion 91. The tubular wand 93 can be configured to be grasped and held by a user and can include an internal passage (not shown) for providing fluid communication between the inlet portion 93 and the outlet portion 91.

Figure 2:
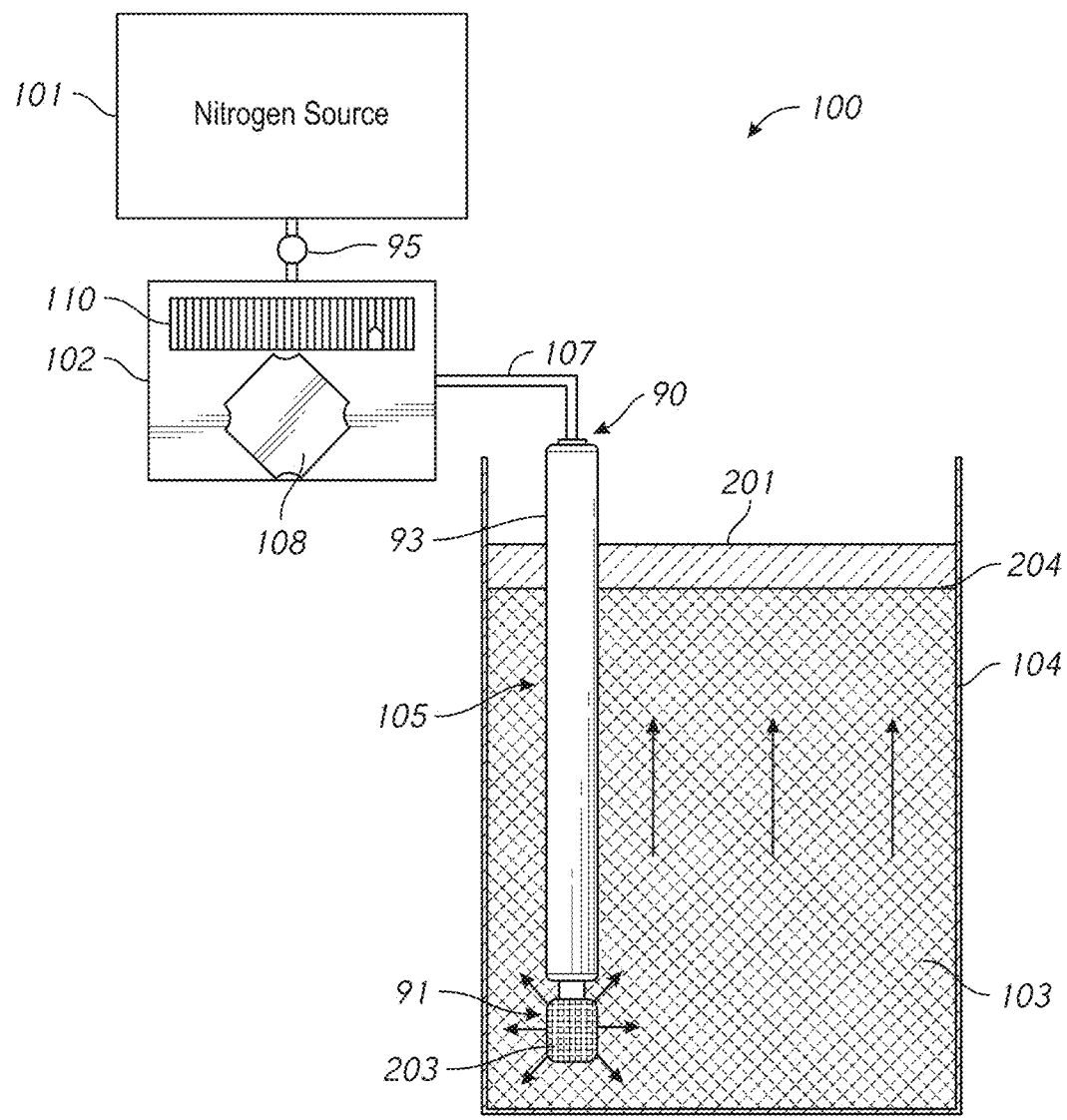
FIG. 2 illustrates the apparatus of FIG. 1 where a flow of gas into the beverage has been initiated.

Turning now to FIG. 2, the apparatus 100 of FIG. 1 is depicted where nitrogen has been allowed to flow through the delivery device 105 into the beverage 103. As shown, the nitrogen can flow out of the storage device 101 and into the delivery device 105 submerged within the beverage 103 housed in the container 104. The nitrogen can flow into the delivery device 105 through the inlet portion 90, and can exit the delivery device through the one or more outlet pores 203 formed on the outlet portion 91 of the delivery device 105. The nitrogen can flow to the surface 204 of the beverage, where some of the nitrogen can be captured at the surface 204 interface to form a head of foam 201. Similarly, as the nitrogen flows through the beverage 103, a proportion of the nitrogen can be dissolved.

As noted above, in certain embodiments, the outlet pores 203 can comprise openings that can have diameters of about 2 µm in one embodiment and in certain embodiments about 0.2 µm, 0.5 µm, 1 µm, 10 µm, and/or 25 µm and in certain embodiments the openings can have diameters from about 0.1 µm to about 150 µm; and in one embodiment from about 1 µm to about 100 µm; 10 µm to 50 µm; or about 20 µm to 25 µm. In certain embodiments, the openings are circular. In various configurations and embodiments described herein, it can be advantageous to ensure that the pores 203 of the delivery device are adequately wetted to ensure proper performance of the device.

Figure 3A:
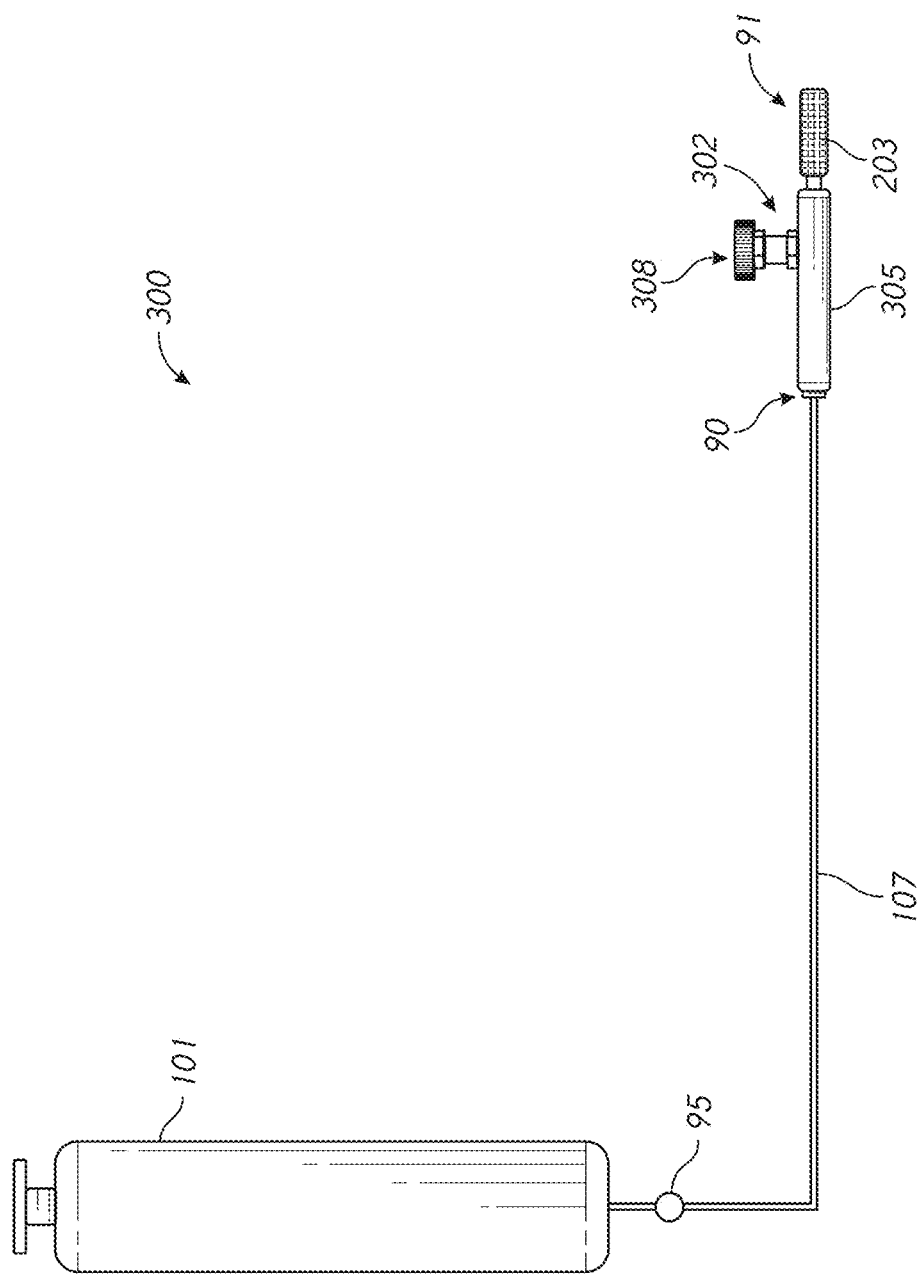
FIG. 3A illustrates an embodiment of a delivery device in accordance with another embodiment of the present disclosure

In certain embodiments, the outlet portion 91 comprises a sintered material which is made from a powder that has been sintered together to form porous material to form the outlet pores 203 described above. In certain embodiments, the outlet portion 91 comprises a sintered metal material which is made from a metal powder that has been sintered together to form porous material. In certain embodiments, the outlet portion 91 comprises a sintered stainless steel which is made from a metal powder that has been sintered together to form porous material. In certain embodiments, the sintered material can be formed into a tube, which is in fluid communication with the internal passage within the tubular wand 93. In other embodiments, the outlet portion 91 can be formed from a tube that has a plurality of openings formed in the wall of the tube to form the outlet pores 203. As noted above, in certain embodiments, the outlet portion 91 of the delivery device 105 can comprise an infuser, a nozzle, a sparger, an injector, a static mixer, an aerator block, a frit, carbonation stone or any other suitable delivery device capable of dispersing nitrogen into a solution FIG. 3A depicts another embodiment of an apparatus 300 suitable for nitrogenating a beverage (not pictured) in accordance with an embodiment of the present disclosure. In FIG. 3A, like numbers are used to refer to parts similar to those of FIGS. 1 and 2 and reference can be made to the description of those parts made with reference to FIGS. 1 and 2. As with the embodiment described with reference to FIGS. 1 and 2, the apparatus 300 can include a storage device 101, which can comprise a reservoir of compressed gas that is in fluid communication with delivery device 105. In the illustrated embodiment, the delivery device 305 is configured similar to the delivery device of FIGS. 1 and 2 but in the delivery device 305 of FIG. 3A the delivery device 305 can include a control device 302 integrated in the delivery device 305. As will be explained below, the control device 302 can include a foot pedal, knob or dial 308 through which the operator can adjust, initiate, halt, or meter the flow of gas that passes through the delivery device 305.

As with the embodiment of FIGS. 1 and 2, the delivery device 305 can be in fluid communication with the storage device 101 through a source line 107. The delivery device 305 can also include an inlet portion 90 that is in fluid communication with the source line 107 and an outlet portion 91, which can include one or more outlet pores 203 as described above through which nitrogen flowing through the delivery device 105 can be delivered to the beverage 103. The tubular wand 93 can extend between the inlet portion 90 and the outlet portion 91 and can be provided with the control device 302 as noted above. As in the embodiment of FIGS. 1 and 2, the tubular wand 93 can be configured to be grasped and held by a user.

As shown in FIG. 3A, a pressure regulator 95 can be positioned between the storage device 101 and the control device 302 in the wand 93. In certain embodiments, the nitrogen within the storage device 101 can be at a relatively high pressure such as a pressure of about 45 psi or about 2000 psi. The pressure regulator 95 can be used to reduce the pressure from the storage device 102 to a lower desired value, which in one embodiment can be about 3.5 psi. Likewise, the pressure regulator 95 can be used to help facilitate a more consistent gas flow rate, which has been found to improve the quality and quantity of foam produced. For instance, it has been found that by avoiding spikes in flow rate, the formation of large bubbles is prevented. Furthermore, high quantities of high quality foam may be produced by maintaining the ideal flow rate from the first instant. In some configurations, a pressure accumulator (not pictured) may be implemented downstream of the pressure regulator 95. In this manner, the pressure accumulator may help minimize the dynamics of the pressure regulator 95, allowing for a more constant pressure to be achieved at the sparger. In modified configurations, the pressure regulator 95 may be an electronically adjustable pressure regulator communicably coupled with a mass flow meter (not pictured). In such a configuration, the mass flow meter may be configured to determine whether a given flow rate is too high or too low, and to provide feedback to the electronically adjustable pressure regulator. In this manner, the electronically adjustable pressure regulator may automatically adjust the flow rate to compensate. In some implementations, additional pressure regulators or solenoid valves may be implemented along source line 107 to provide further granular control over gas flow characteristics in order to achieve an arbitrary flow rate having desired characteristics. For instance, in some configurations, a mass flow controller (not pictured) may be implemented along source line 107, and placed in fluid communication with a purge valve (not pictured). In this manner, when flow begins and the mass flow controller has not yet achieved the desired conditions, the flow of gas may be directed to the purge valve, away from the wand 93. Once the mass flow controller has started to approach the correct flow rate, the gas flow may be redirected away from the purge valve, towards the wand 93 to ensure a relatively constant rate of flow.

Figure 3B:
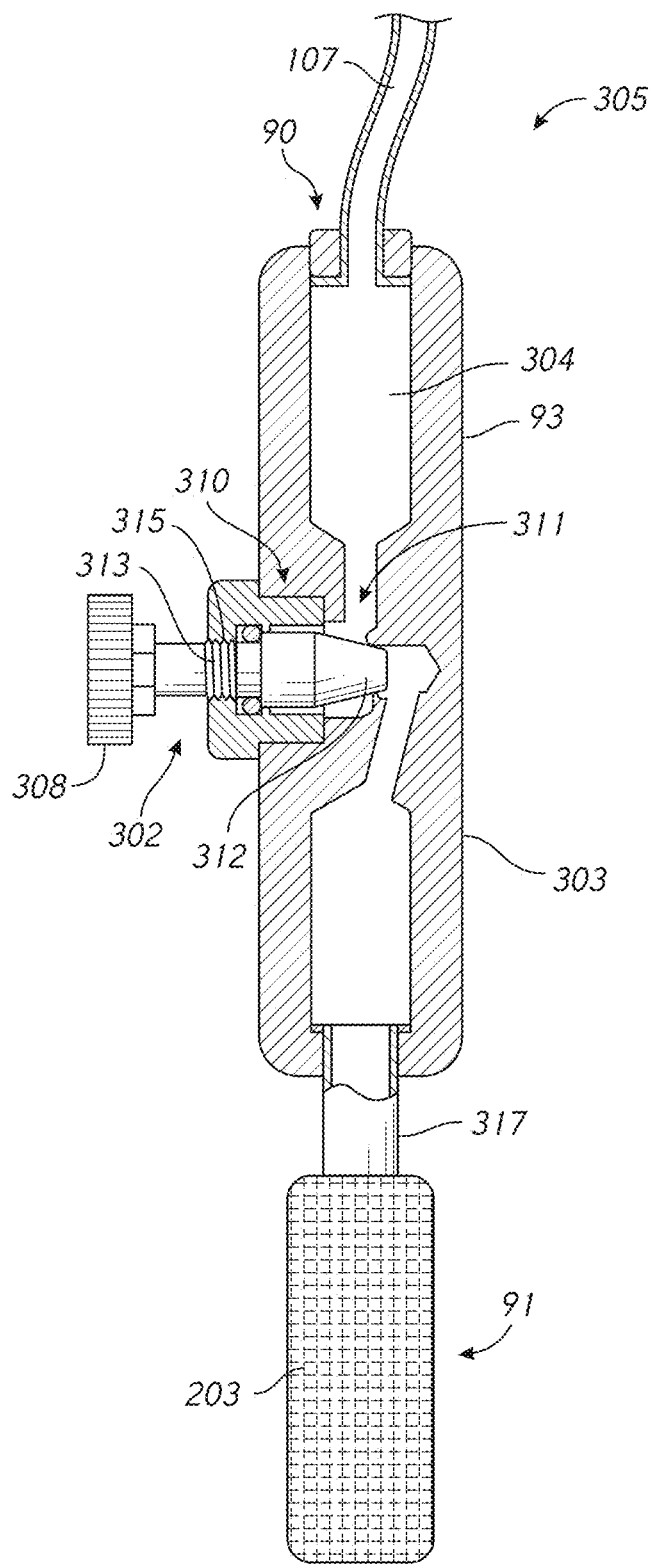
FIG. 3B illustrates a partial cross sectional view of the delivery device of FIG. 3A.

FIG. 3B depicts a partial cross sectional view of the delivery device 305 of FIG. 3A. As illustrated, the source line 107 can be in fluid communication with the inlet portion 90 of the delivery device 305. The tubular wand 93 can define an internal passage 304, which can be in fluid communication with the plurality of outlet pores 203 at the outlet portion 91 of the delivery device 305. The wand 93 can be formed from a tube 303 that can be formed of stainless steel or other suitable material. As noted above, the outlet portion 91 can comprise a sintered material (e.g., a metal such as, for example, stainless steel) which is made from a powder (e.g., a metal powder) that has been sintered together to form porous material. In other embodiments, the outlet portion 91 can be formed from a tube with an open end and a closed that has a plurality of openings formed in a side wall of the tube to form the outlet pores 203. As shown in FIG. 3B, the outlet portion 91 can form a tubular member that is in fluid communication with the internal passage 304 through a connection tube 317. As noted above, the outlet pores 203 can comprise openings that can have diameters of about 2 µm in one embodiment and in certain embodiments about 0.2 µm, 0.5 µm, 1 µm, 10 µm, and/or 25 µm and in certain embodiments the openings can have diameters from about 0.1 µm to about 150 µm; and in one embodiment from about 1 µm to about 100 µm; 10 µm to 50 µm; or about 20 µm to 25 µm.

With continued reference to FIG. 3B, the control device 302 can be in the form of a needle valve, which can include port 311 in the internal passage 304 and can include a needle 312 coupled to a threaded shaft 313. The threaded shaft 313 can be coupled to the dial 308. The threaded shaft 313 can extend through a threaded bore 315 such that rotation of the dial 308 can cause the needle 312 to move. In this manner, the needle 312 can selectively close, open or partially open the port 311 to control the flow rate of gas through the internal passage 304 and through the outlet pores 203. An advantage of the embodiment of FIG. 3B is that the control device 302 and valve 310 can be disposed on the delivery device 305 itself. Such a configuration can advantageously prevent excess gas from passing through the delivery device 305 after the valve 310 has been closed by eliminating excess tubing between the control device 302 and the delivery device 305, which would otherwise allow excess space for the gas to reside within once the flow of gas had ceased A view of a method for nitrogenating a beverage in accordance with certain embodiments with the present disclosure is illustrated in FIGS. 4A-D. It should be appreciated that FIGS. 4A-D illustrate the delivery device 105 of FIG. 1; however, the methods can also be used with the devices of FIGS. 3A, 3B, and FIG. 5 and/or other embodiments described herein.

FIG. 4A depicts the beverage 103 residing in the container or vessel 104 having the opening 106 at the top of the container. In some embodiments, the vessel 104 is unpressurized. FIG. 4B depicts the delivery device 105 according to, for example, an embodiment described herein inserted into the vessel 104 through the opening 106 in the top of the container. A portion of the delivery device 105 (for example, the outlet portion 91 or a portion thereof) can be submerged within the beverage 103, and a flow of nitrogen has not been initiated, although in some embodiments, it can be advantageous to initiate the flow of gas before submerging the delivery device within the beverage. In the illustrated embodiment, the source line 107 serves to connect the inlet 90 of the delivery device with the control device 102 (not illustrated in FIGS. 4A-D), which is in fluid communication with the storage device 101 (not illustrated in FIGS. 4A-D). The inlet 90 of the delivery device can extend beyond the opening 106 of the vessel 104, whereas the plurality of outlet pores 302 are submerged within the beverage 103 near the bottom of the vessel 104. While FIGS. 4A-4D are described in the context of the apparatus 100 of FIGS. 1 and 2 it should be appreciated that the method can be applied to the apparatus 300 of FIGS. 3A and 3B and 5 (described below). As noted above, submerging the delivery device 105 within the beverage 103 can comprise inserting a portion of the delivery device 105 into a beverage and/or covering a portion of the delivery device 105 with a beverage 103. In certain embodiments, submerging the delivery device 105 within the beverage 103 can comprise inserting the outlet portion 91 or a portion of the outlet portion 91 of the delivery device 105 into a beverage and/or covering the outlet portion 91 or covering a portion of outlet portion 91 of the delivery device 105 with a beverage 103.

FIG. 4C depicts a delivery device 105 a portion of which can be submerged within the unpressurized container after the flow of nitrogen has been initiated, and the nitrogen is bubbling up through the beverage. In certain embodiments, the pressure of nitrogen delivered to the delivery device can be less than about 0.5 psi, less than about 1 psi, less than about 1.5 psig, less than about 3 psig, less than about 6 psig, or less than about 10 psig. In some embodiments, the pressure may range between 0.5 psig and 6 psig, between 1 psig and 5 psig, or between 1.5 psig and 4 psig. In some embodiments, the pressure may be greater than about 1 psig, greater than about 2 psig, or greater than about 10 psig. In some embodiments, the pressure can be maintained for longer than about 10 seconds, longer than about 30 seconds, longer than about 1 minute, longer than about 2 minutes, longer than about 3 minutes, or longer than about 5 minutes. In some embodiments, the pressure can be maintained for about 5 seconds to 2 minutes, about 10 seconds to 1 minute, or about 10 to 30 seconds. To reach the desired level of saturation, the process can be prolonged or repeated as necessary. In some embodiments, the amount of pressure, or duration of dispersal can vary between dispersals and can be a function of the type of beverage being nitrogenated and/or the desired amount of nitrogenation. In some embodiments, the process can be repeated at least twice, at least four times, less than eight times, or about three times.

In certain embodiments, the outlet portion 91 of the delivery device 105 can be rotated, swirled, stirred, and/or moved up and down while flow of nitrogen has been initiated through the outlet portion 91, and the nitrogen or other gas is bubbling up through the beverage. Agitation has been found to increase the quantity and quality of foam produced. It has been found that a vigorous, irregular combination of various movements, including at least partial swirling and stirring movements in combination with irregular linear vertical and horizontal adjustments yield a substantially higher quality foam than would be otherwise produced using a stationary device or stirring movements alone. In embodiments in which a control device 302 is provided, it can be advantageous to gradually up the pressure flowing through the delivery device 105 to a target pressure, such as, 3.5 psi over a period of time such as 1 to 2 seconds and then maintain the target pressure for a second period of time, such as for example, 10 to 30 seconds, until the desired amount of head is formed in the beverage.

FIG. 4D depicts a nitrogenated beverage where the delivery device 105 has been removed, leaving behind a head of foam 201 disposed at the top of the beverage. By nitrogenating a single serving of a beverage, nitrogenated drinks can be prepared directly in front of the consumer, allowing for increased theater and enhancing the overall customer experience.

The techniques and methods described of FIGS. 4A-D can advantageously allow for the production of a customized and/or individualized beverage that can be prepared in individual portions for each customer. In certain embodiments, an individual portion comprises between about 6 fluid ounces and about 50 fluid ounces of the beverage and in certain embodiments between about 12 fluid ounces and about 30 fluid ounces of the beverage. In certain embodiments, the vessel 104 is configured to hold individual portions of beverages and is configured to hold between about 6 fluid ounces and about 50 fluid ounces of beverage and in certain embodiments between about 12 fluid ounces and about 30 fluid ounces of beverage. Because in certain arrangements, the nitrogenation can be performed on a serving-by-serving basis in individual portions, the techniques and methods described of certain embodiments described herein can provide the opportunity for increased customizability and theatre in the preparation of nitrogenated beverages. In addition, because techniques and methods described herein can be utilized to prepare individual portions of a beverage the beverage can be delivered to the customer shortly after the process of injecting the beverage with gas (for example, nitrogen). In certain embodiments, after injecting the beverage with gas (for example, nitrogen) the beverage is delivered to a customer within less than 5 seconds, and in certain embodiments within about 2 minutes of the stopping the flow of gas into the beverage and in certain embodiments within about 4 minutes of the stopping the flow of gas into the beverage.

Periodically, it can be advantageous to clean the delivery device 105, 305 according to any of the embodiments described herein to improve the flow of gas through the delivery device 105, as well as for aesthetic, hygienic and food safety purposes. In various embodiments of the present disclosure, the delivery device 105 can be cleaned using a warm, damp cloth and wiping down the exterior of the delivery device 105. In some embodiments, it can be advantageous to initiate a flow of gas through the delivery device 105 to aid in cleaning to expel fluid or dried particulate matter through the outlet pores. In some embodiments, a flow of gas having a pressure of about 1 psig to about 15 psig may be applied to the delivery device 105 during cleaning. In certain embodiments, the delivery device can be passed under an air knife or similar device to blow away foam or liquid on the delivery device and/or to dry the device between uses. In some embodiments, the delivery device 105 may be placed in a cleaning solution when not in use. Any food safe cleaning solution may be used, including water, and various dish soaps, detergents, and sanitizers. In some embodiments, Cafiza (available from Urnex) is used. In some embodiments, the cleaning solution can be effective to continuously remove contaminants and keep the pores 203 wet to prevent the formation of undesirably large bubbles during nitrogenation. In certain configurations, it can be advantageous to rinse the delivery device 105 with water, or another suitable liquid, to remove excess cleaning solution from the delivery device prior to use. Similarly, it can be advantageous to rinse the delivery device 105 after use for food safety purposes to remove contaminants. When the delivery device 105 is rinsed before or after use, it can be advantageous to flow compressed gas through the device to expel contaminants and excess cleaning solution from the delivery device 105. In some embodiments, after the delivery device 105 has been used, it may be rinsed externally with water (or other suitable cleaning fluid), and internally purged with gas to flush out any contaminants dislodged in the rinsing process and reduce or prevent wicking of contaminated cleaning fluid back into the device 105. For instance, in some configurations, the delivery device 105 may be rinsed while a flow of gas is permitted through the device 105 for a period, followed by a period wherein the external flow of cleansing fluid is halted while the flow of gas is permitted to persist, followed by the simultaneous flow of cleansing fluid and gas to expel dislodged contaminants. Likewise, the flow of cleansing fluid may be permitted to persist while the flow of gas through the device 105 is halted. In some additional embodiments, water or cleaning solution may be forced through the pores 203, either in place of, or in conjunction with, compressed gas to facilitate cleaning of the delivery device 105 as a stand-alone cleansing procedure, or as part of a more comprehensive cleaning protocol, such as a three-step wash, rinse, and sanitize procedure.

Figure 6A:
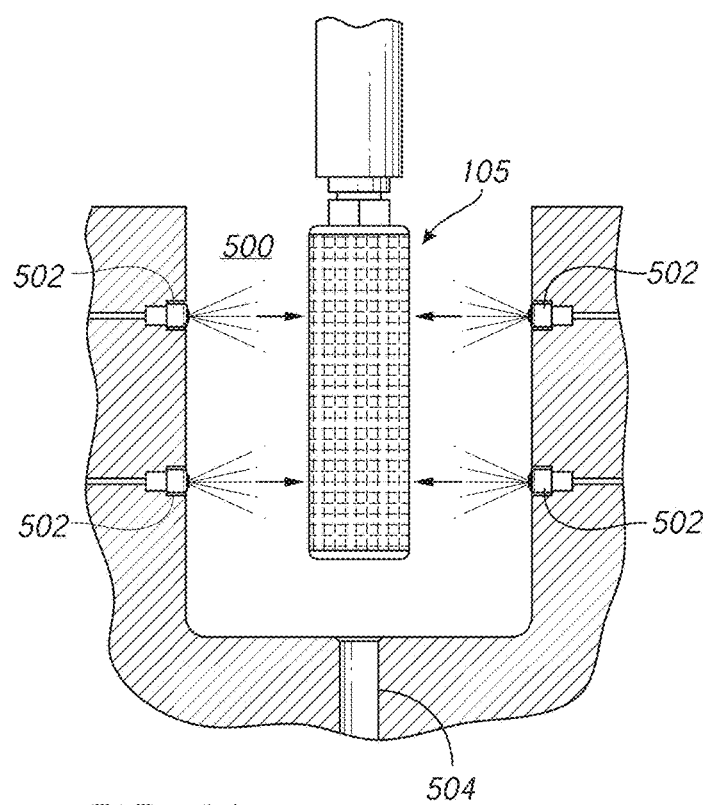
FIG. 6A is a schematic partial cross-sectional illustration of device for cleaning a delivery device.
Figure 6B:
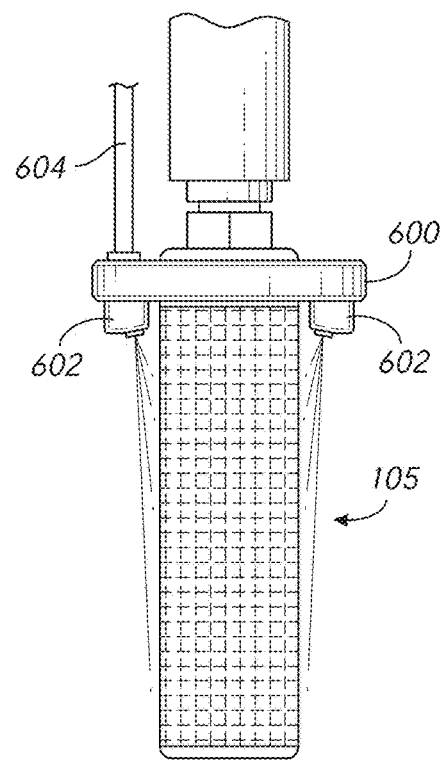
FIG. 6B is a schematic partial cross-sectional illustration of another device for cleaning a delivery device.

FIG. 6A schematically illustrates one embodiment of method and apparatus for cleaning a delivery device 105 according to the embodiments described herein. In this embodiment, the delivery device 105 after use can be placed within a cavity 500 which can be provided with one or more jets 502 positioned around the cavity 500. The delivery device 105 can be positioned within the cavity and water and/or another cleaning solution can be injected through the jets 502 and onto the delivery device. The used water and/or cleaning solution can then flow out of the cavity 500 through a drain 504. FIG. 6B schematically illustrates another embodiment of method and apparatus for cleaning a delivery device 105 according to the embodiments described herein which can be used with the device of FIG. 6A or by itself. As shown in FIG. 6B, the delivery device 105 may be provided with an annular ring 600 positioned on an upper portion of the delivery device 105. The annular ring 600 can include one or more jets and/or form an annular opening 602 that is connected by a tube 604 to a source of water and/or cleaning solution. When activated water and/or cleaning solution can flow through the one or more jets and/or the annular opening 602 to clean the outer surface of the delivery device.

Prior to using the delivery device 105 after a period of non-use, it can be advantageous to ensure the device's pores are properly wetted to ensure proper performance of the device. For example, it certain configurations, it may be advantageous to ensure the device's pores are properly wetted after a period of non-use longer than an hour. For example, in some configurations, it may be advantageous to ensure the device's pores are properly wetted prior to the first use of the day, or prior to the first use of a new delivery device 105. In various embodiments disclosed herein, it may be advantageous to wet the pores of the device by rinsing the device with an external flow of a cleansing fluid (such as water), allowing the fluid to wick into the pores of the delivery device 105, and then pulsing a flow of gas through the device 105. In some configurations, the flow of gas may be simultaneous with the external flow of cleansing fluid, while in the same or additional configurations, the flow of gas and cleansing fluid may be alternated. The alternating and/or simultaneous flow of cleansing fluid and gas may be repeatedly initiated and terminated over a period ranging from about 30 seconds to about 30 minutes, such as for about 30 seconds, about 1 minute, about 2 minutes, about 5 minutes, about 10 minutes, about 15 minutes, about 20 minutes, about 25 minutes, or about 30 minutes or any time period between the aforementioned times. In some configurations, it can be advantageous to ensure the pores of the delivery device 105 are adequately wetted before beginning the preparation of a beverage or after a new delivery device 105 has been fitted to the system 100.

Figure 5:
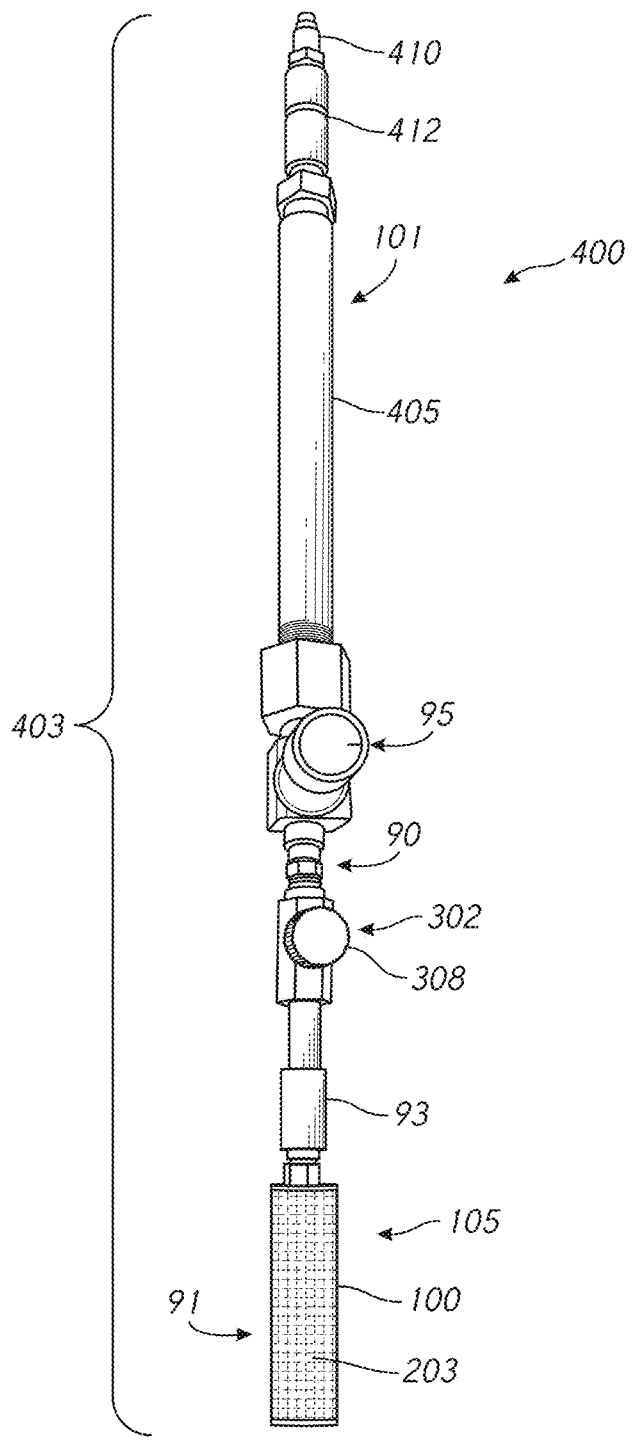
FIG. 5 illustrates another embodiment of a delivery device of the present disclosure.

In the illustrated embodiments of FIGS. 1-3A, the delivery device 105 is shown as a separate component from the storage device 101 that is connected to the storage device by the source line 107. However, in certain embodiments, the delivery device 105 and storage device 101 can form an integral unit 403 such that a user can hold the integral unit 403 with their hands and move two components 105, 101 together as a unit 403. For example, FIG. 5, depicts an embodiment similar to the embodiment of FIG. 3A wherein the delivery device 105, the gas storage device 101 and the control device 302 have been integrated together to form the unit 403. In FIG. 5, like numbers are used to refer to parts similar to those of FIGS. 3A and 3B. In the illustrated embodiment, the storage device 101 can be in the form of an elongate tubular member 405. A gas fitting 410, such as for example, a quick connect gas fitting, can be provided at one end of the tubular member 405 and can be used to connect the storage device 101 to an external compressed gas source to fill the storage device 101 with compressed gas. A check valve 412 can be positioned downstream of the gas fitting 410 to prevent gas from escaping the gas fitting 410. In this manner, in certain embodiments, the storage device 101 can be used multiple times and then "recharged" with additional compressed gas from a larger gas storage device or other source of compressed gas.

A pressure regulator 95 can be incorporated into the unit 403 and can be used to adjust the pressure of gas from the storage device 101 delivered to a control device 302, which can be similar to the control device 302 described above with reference to FIG. 3B. Accordingly, in certain arrangements, the control device 302 can be in the form of a needle valve, which can include a port (not shown) in an internal passage (not shown) in the delivery device 105 and can include a needle (not shown) coupled to a threaded shaft. The threaded shaft can be coupled to the dial 308. The threaded shaft can extend through a threaded bore such that rotation of the dial 308 can cause the needle to move. In this manner, the needle 312 can selectively close, open or partially open the port 311 to control the flow rate of gas through the internal passage and through the outlet pores 203 at the outlet portion 91 of the delivery device 105. The control device 302 can be used to control the rate at which nitrogen gas will flow into the outlet portion 91. As noted above, the outlet portion 91 can be configured as described above with respect to the embodiments of FIGS. 1A-3B and can include a plurality of pores 203 as described above.

In the embodiment of FIG. 5, the storage device 101, regulator 95, delivery device 105 and the control device 302 are integrated into the integral unit 403 such that a user can hold the integral unit 403 with their hands and move these components 101, 95, 105, 302 together as a unit 403. In modified arrangements, only some or different combinations of these components can be integrated into a unit 403 and/or additional components could be added to the integral unit 403.

Figure 7:
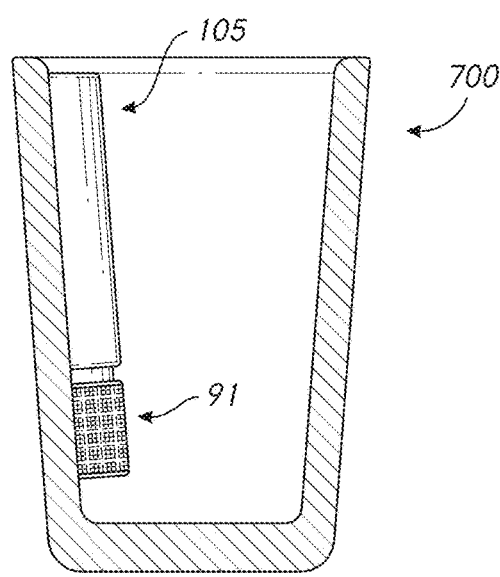
FIG. 7 is a schematic partial cross-sectional view of a delivery device integrated into a container.

FIG. 7 is a schematic illustration of an embodiment in which the delivery device 105 can be integrated into the container 700. For example, in the illustrated embodiments, an outlet portion 91 of the delivery device 105 can be built into or integrated into a lower portion of the container 700. In such arrangements, once the beverage is nitrogenated the beverage can be poured out of the container 700 and into a second container such as a cup that can be used by the customer and/or consumer of the beverage, or the container 700 may include a disposable delivery device and/or outlet portion, which can be discarded with the container after the beverage is consumed. In one embodiment, the outlet portion 91 of the delivery device 105 can be submerged within a beverage by covering or partially covering the outlet portion 91 of the delivery device 105 with a beverage by pouring a beverage into the container 700.

In sum, the techniques and methods disclosed herein present several advantages over prior methods. In particular, the handheld form-factor of the delivery device described herein allows for the creation of a wide array of customized beverages, and provides increased theater for the customer. For instance, nitrogenated beverages can be prepared before the customer directly at the counter. Moreover, by incorporating the reservoir of compressed gas into the delivery device, customized beverages can be prepared anywhere without a source line connecting the delivery device to a source of compressed gas external to the delivery device, allowing for the production of customized beverages nearly anywhere. For instance, in some embodiments, customized beverages may be nitrogenated at a customer's tableside.

Conditional language, for example, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Summary

Although this disclosure describes certain embodiments and examples of beverage enhancement systems, many aspects of the methods and devices shown and described in the present disclosure may be combined differently and/or modified to form still further embodiments or acceptable examples. All such modifications and variations are intended to be included herein within the scope of this disclosure. Indeed, a wide variety of designs and approaches are possible and are within the scope of this disclosure. For example, although some embodiments have been disclosed that are directed specifically to coffee, the use of the beverage enhancement system for other types of beverages is contemplated as well. While illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure, are intended to be included as well.

Also, although there may be some embodiments within the scope of this disclosure that are not expressly recited above or elsewhere herein, this disclosure contemplates and includes all embodiments within the scope of what this disclosure shows and describes. Further, this disclosure contemplates and includes embodiments comprising any combination of any structure, material, step, or other feature disclosed anywhere herein with any other structure, material, step, or other feature disclosed anywhere herein.

Furthermore, certain features that are described in this disclosure in the context of separate implementations, arrangements and/or embodiments can also be implemented in combination in a single implementation arrangements and/or embodiments. Conversely, various features that are described in the context of a single implementation arrangements and/or embodiments can also be implemented in multiple implementations arrangements and/or embodiments separately or in any suitable subcombination. Moreover, although features may be described above as acting in certain combinations, one or more features from a claimed combination can, in some cases, be excised from the combination, and the combination may be claimed as a subcombination or variation of a subcombination.

The terms "approximately," "about," and "substantially" as used herein represent an amount close to the stated amount that still performs a desired function or achieves a desired result. For example, in some embodiments, as the context may dictate, the terms "approximately", "about", and "substantially" may refer to an amount that is within less than or equal to 10% of the stated amount or equal to or greater than 10% of the stated amount. The term "generally" as used herein represents a value, amount, or characteristic that predominantly includes or tends toward a particular value, amount, or characteristic. The ranges disclosed herein also encompass any and all overlap, sub-ranges, and combinations thereof. Language such as "up to," "at least," "greater than," "less than," "between," and the like include the number recited. Numbers preceded by a term such as "about" or "approximately" include the recited numbers and should be interpreted based on the circumstances (e.g., as accurate as reasonably possible under the circumstances, for example. For example, "about 1 gram" includes "1 gram." In the embodiments described in this application, terms such as "about" or "approximately" within the specification or claims that precede values or ranges can be omitted such that this application specifically includes embodiments of the recited values or ranges with the terms "about" or "approximately" omitted from such values and ranges.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Some embodiments have been described in connection with the accompanying drawings. However, the figures are not drawn to scale. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Also, any methods described herein may be practiced using any device suitable for performing the recited steps.

Moreover, while components and operations may be depicted in the drawings or described in the specification in a particular arrangement or order, such components and operations need not be arranged and performed in the particular arrangement and order shown, nor in sequential order, nor include all of the components and operations, to achieve desirable results. Other components and operations that are not depicted or described can be incorporated in the embodiments and examples. For example, one or more additional operations can be performed before, after, simultaneously, or between any of the described operations. Further, the operations may be rearranged or reordered in other implementations. Also, the separation of various system components in the implementations described above should not be understood as requiring such separation in all implementations, and it should be understood that the described components and systems can generally be integrated together in a single product or packaged into multiple products.

In summary, various illustrative embodiments and examples of beverage preparation systems, components, and related methods have been disclosed. Although the systems have been disclosed in the context of those embodiments and examples, this disclosure extends beyond the specifically disclosed embodiments to other alternative embodiments and/or other uses of the embodiments, as well as to certain modifications and equivalents thereof. This disclosure expressly contemplates that various features and aspects of the disclosed embodiments can be combined with, or substituted for, one another. Accordingly, the scope of this disclosure should not be limited by the particular disclosed embodiments described above, but should be determined only by a fair reading of the claims that follow as well as their full scope of equivalents.

What is claimed is:

1. A method of providing a beverage, the method comprising:
submerging at least a portion of the delivery device within a beverage contained within an unpressurized container;
initiating a first flow of gas through outlet pores of the delivery device into the beverage while the container remains unpressurized; and
rinsing the delivery device with an external flow of a cleansing liquid while a second flow of gas is permitted through the delivery device;
halting the external flow of the cleansing liquid while the second flow of gas is permitted through the outlet pores of the delivery device; and
resuming the external flow of the cleansing liquid while the second flow of gas is permitted through the outlet pores of the delivery device.

2. The method of claim 1, wherein initiating the first flow of gas through the delivery device occurs before submerging the delivery device into the beverage.

3. The method of claim 1, wherein the unpressurized container is open to the atmosphere.

4. The method of claim 1, further comprising serving the beverage to a customer from the unpressurized container.

5. The method of claim 1, further comprising delivering the beverage to a customer within 3 minutes of stopping the first flow of gas through the delivery device.

6. The method of claim 1, wherein the unpressurized container holds between 6 and 50 ounces of fluid.

7. The method of claim 1, wherein the first flow of gas comprises nitrogen, wherein the first flow of gas is maintained for 2 seconds to 3 minutes.

8. The method of claim 7, further comprising halting the first flow of gas for 2 seconds to 30 seconds.

9. The method of claim 8, further comprising initiating at least a second flow of gas through the delivery device into the beverage.

10. The method of claim 9, wherein the second flow of gas is maintained for 2 seconds to 3 minutes.

11. The method of claim 1, wherein the beverage comprises coffee.

12. The method of claim 1, wherein the beverage comprises tea.

13. The method of claim 1, wherein the submerging at least the portion of the delivery device within the beverage comprises pouring the beverage over at least a portion of the delivery device and into the unpressurized container.

14. The method of claim 1, wherein the submerging at least the portion of the delivery device within the beverage comprises inserting the portion of the delivery device comprising an outlet into the beverage contained within the unpressurized container.

15. The method of claim 1 comprising wetting the outlet pores of the delivery device with a cleansing liquid and allowing the cleansing liquid to wick into the outlet ports.

16. The method of claim 1 comprising, before submerging the delivery device into a beverage, rinsing the delivery device with an external flow of cleaning liquid and pulsing flow of gas through the outlet pores of the delivery device concurrently with the rinsing.

* * * * *